United States Patent
Richter et al.

(10) Patent No.: US 11,014,052 B2
(45) Date of Patent: May 25, 2021

(54) METHOD FOR PRODUCING A PERMEATION MEMBRANE

(71) Applicant: Fraunhofer-Gesellschaft zur Foerderung der angewandten Forschung e. V., Munich (DE)

(72) Inventors: Hannes Richter, Hermsdorf (DE); Adrian Simon, Bad Klosterlausnitz (DE); Norman Reger-Wagner, Bad Klosterlausnitz (DE); Janine Hercher, Grosseutersdorf (DE)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 138 days.

(21) Appl. No.: 16/136,409

(22) Filed: Sep. 20, 2018

(65) Prior Publication Data
US 2019/0091634 A1 Mar. 28, 2019

(30) Foreign Application Priority Data
Sep. 21, 2017 (DE) .......................... 102017121871.8

(51) Int. Cl.
*B01D 67/00* (2006.01)
*C01B 3/50* (2006.01)
(Continued)

(52) U.S. Cl.
CPC ..... *B01D 67/0069* (2013.01); *B01D 19/0031* (2013.01); *B01D 53/228* (2013.01);
(Continued)

(58) Field of Classification Search
None
See application file for complete search history.

(56) References Cited

U.S. PATENT DOCUMENTS

| | | | |
|---|---|---|---|
| 8,429,169 B2 | 4/2013 | Koopmans et al. | |
| 2003/0190486 A1 | 10/2003 | Roa et al. | |

(Continued)

FOREIGN PATENT DOCUMENTS

| GB | 956176 A | 4/1964 |
|---|---|---|
| JP | 2007054693 A | 3/2007 |

(Continued)

OTHER PUBLICATIONS

Bundesministerium fuer Wirtschaft and Arbeit (ed.); Strategiepapier zum Forschungsbedarf in der Wasserstoff—Energietechnologie; 2005.
(Continued)

*Primary Examiner* — Shamim Ahmed
*Assistant Examiner* — Bradford M Gates
(74) *Attorney, Agent, or Firm* — Abel Schillinger, LLP

(57) ABSTRACT

Disclosed is a method for producing a palladium-based permeation membrane which is suitable for the separation of hydrogen from gas-gas or liquid-gas mixtures. The permeation membrane is produced by applying a palladium complex, dissolved in a solvent, to a nanoporous support system having pores in a size range of from 0.5 nm to 50 nm, removing the solvent by drying, removing of organic constituents of the palladium complex by a heat treatment, and carrying out a final heat treatment under reducing conditions at a temperature ranging from about 300° C. to about 900° C.

20 Claims, 1 Drawing Sheet

(51) Int. Cl.

| | |
|---|---|
| *H01M 4/88* | (2006.01) |
| *H01M 4/92* | (2006.01) |
| *B01D 19/00* | (2006.01) |
| *B01D 53/22* | (2006.01) |
| *B01D 69/10* | (2006.01) |
| *B01D 71/02* | (2006.01) |

(52) U.S. Cl.
CPC ..... *B01D 67/0083* (2013.01); *B01D 67/0095* (2013.01); *B01D 69/10* (2013.01); *B01D 71/022* (2013.01); *C01B 3/505* (2013.01); *H01M 4/885* (2013.01); *H01M 4/8817* (2013.01); *H01M 4/925* (2013.01); *C01B 2203/0233* (2013.01); *C01B 2203/0405* (2013.01)

(56) References Cited

U.S. PATENT DOCUMENTS

| | | |
|---|---|---|
| 2009/0235063 A1 | 9/2009 | Skoric et al. |
| 2013/0152786 A1 | 6/2013 | Correia et al. |

FOREIGN PATENT DOCUMENTS

| | | |
|---|---|---|
| WO | 9817378 A2 | 4/1998 |
| WO | 03084628 A2 | 10/2003 |
| WO | 200804169 A2 | 1/2008 |
| WO | 2012030212 A1 | 3/2012 |

OTHER PUBLICATIONS

Schaefer, C; Diffusionseigenschaften bestimmter Metalle bei der Hochtemperatur—Wasserstoffabtrennung; Dissertation; Munchen; 2010; 114.

Shanahan, L K; Wang, D; Flanagan, B T; Permeation and Diffusion of Hydrogen Through Pd Membranes; U.S. Department of Energy—WSRC-MS-2002-00899, 2002.

Terra NM, Lemos COT, Silva FBd, Cardoso VL; Reis MHM; Characterisation of asymmetric Alumina hollow fibers: Application for Hydrogen Permeation in Composite Membranes; Braz. J. Chem. Eng. 2016; 33(3); 567-76.

Tanaka D, Tanoc M, Okazaki J, Wakui Y, Mizukami F, Suzuki TM; Preparation of "pore-fill" type Pd-YSZ-g-Al2O3 composite membrane supported on a-Al2O3 tube for hydrogen separation; J. Mem. Sci. 2008(320); 436-41.

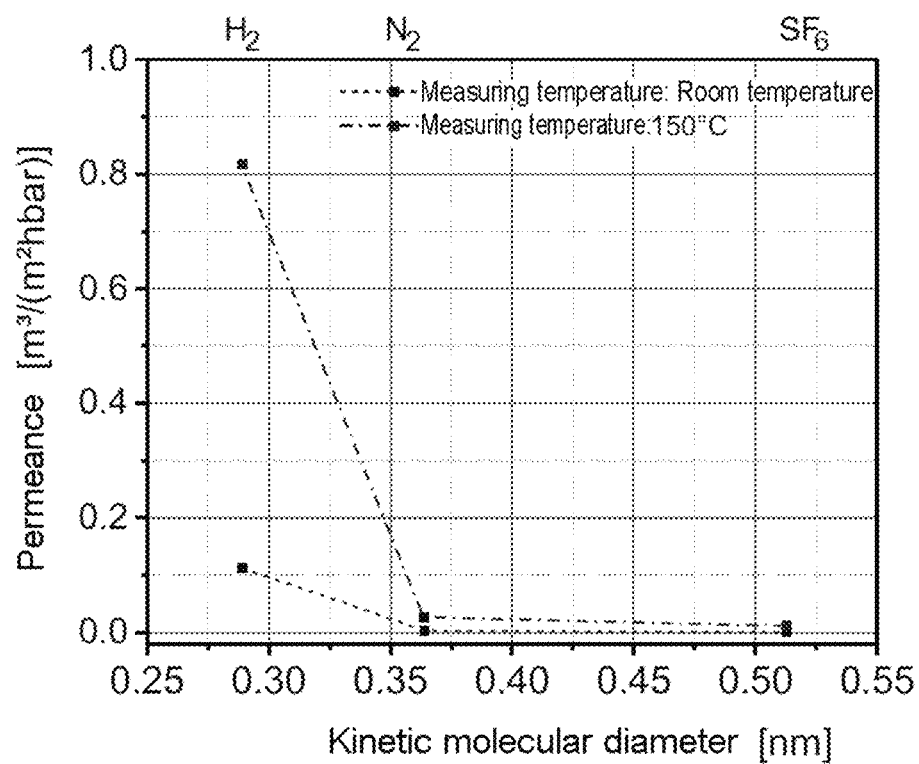

METHOD FOR PRODUCING A PERMEATION MEMBRANE

CROSS-REFERENCE TO RELATED APPLICATIONS

The present application claims priority under 35 U.S.C. § 119 of German Patent Application No. 102017121871.8, filed Sep. 21, 2017, the entire disclosure of which is expressly incorporated by reference herein.

BACKGROUND OF THE INVENTION

1. Field of the Invention

The invention relates to a method for producing palladium-based permeation membranes for the separation of hydrogen from gas-gas or liquid-gas mixtures. The permeation membranes can be used, for example, in fuel cells, in membrane reactors or in separation processes.

2. Discussion of Background Information

Hydrogen is becoming increasingly important as an alternative energy source to oil and gas. As a sustainable emission-free energy resource, it plays a leading part in all power-to-X processes and is moving up the rankings as a secondary energy carrier. Its availability, and the lowering of $CO_2$ emissions, make a positive contribution to global warming and to climate protection.

There are various methods by which hydrogen can be obtained. In Germany, 50% of the hydrogen is obtained from naphtha and natural gas. The other major fraction is generated in refineries, and a small portion on the basis of electrolysis (Bundesministerium für Wirtschaft and Arbeit [German Federal Ministry of Economy and Labor] (ed.); Strategy paper on research demand in hydrogen energy technology; 2005).

One attractive approach is the production of synthesis gas by way of steam reforming or processes of direct gasification. The gas resulting from such production is a starting point for other chemical processes and, alongside other constituents, includes a major fraction of hydrogen. This hydrogen can be separated from the gas, using a hydrogen-selective membrane, and can be made available for other applications.

Palladium is predestined for hydrogen separation, for a number of reasons. On account of its precious metal character, it has very high oxidation stability, and so a broad spectrum of applications are addressed. Furthermore, palladium possesses the capacity to adsorb approximately 600 times the amount of hydrogen at room temperature. A disadvantage for use as a membrane material, however, is its price. Because of this, efforts are under way to find alternative metals to palladium for efficient hydrogen separation (Nb, Ti, Ni, Ta, V) (Schäfer, C; Diffusion properties of certain metals in high-temperature hydrogen separation; Dissertation; Munich 2010; 114). A major problem here is their oxidation stability. The oxidation layer would lead to a loss of permeance and so considerably reduce the efficiency of the membrane. To validate the use of palladium-based membranes, there must be a drastic reduction in the production costs. The monetary and limiting step is the layer thickness of the membrane.

The literature reports layer thicknesses of greater than 95 µm (Shanahan, L K; Wang, D; Flanagan, B T; Permeation and Diffusion of Hydrogen Through Pd Membranes; U.S. Department of Energy—WSRC-MS-2002-00899 2002). There are existing approaches for applying palladium layers to porous ceramic or metal supports. One commonplace method for achieving this is that of "electroless plating". Höllein, V; Palladium-based composite membranes for dehydrogenation of ethyl benzene and propane; Dissertation; Erlangen; 2004; 204, reports the need for a critical layer thickness of at least 3 µm in order to realize a defect-free layer by means of "electroless plating". In current work by Terra et al. (Terra N M, Lemos C O T, Silva F B d, Cardoso V L; Reis M H M; Characterisation of asymmetric Alumina hollow fibers: Application for Hydrogen Permeation in Composite Membranes; Braz. J. Chem. Eng. 2016; 33(3); 567-76), controversially, there are reports on the preparation of palladium layers on hollow aluminum oxide fibers by means of electroless plating. The layer thicknesses achieved are in the range from 1.4 to 1.8 µm.

A further decisive criterion is the service temperature. Looking at the phase diagram for palladium-hydrogen, a miscibility gap is apparent below a temperature of 300° C. This means that two phases are present in parallel alongside one another and may undergo conversion according to temperature. The conversion of both phases leads to material fatigue and ultimately to embrittlement (hydrogen embrittlement). This is the basis for the fact that palladium membranes can be operated rationally only from a temperature of 300° C.

The material embrittlement is counteracted by controlled doping of heteroatoms. This may be realized, for example, through addition of silver or yttrium. Studies by Darling (Alan Sydney Darling; Improvements in and relating to the Separation of Hydrogen from Gaseous Mixtures containing Hydrogen (GB 956176A I); 1962; [Nov. 24, 2015]) have shown a palladium-silver alloy with 20 to 23% by weight of silver to represent the optimum in hydrogen permeation for this alloy system. At 23% by weight of silver, it was possible to ascertain a specific hydrogen diffusion rate which was greater by about 1.7 to 1.8 times. Besides silver as an alloying element, copper and yttrium also possess similar or higher hydrogen permeations.

Another option for counteracting embrittlement lies in the use of a porous support system. Tanaka et al. (Tanaka D, Tanoc M, Okazaki J, Wakui Y, Mizukami F, Suzuki T M; Preparation of "pore-fill" type Pd-YSZ-g-Al2O3 composite membrane supported on a-Al2O3 tube for hydrogen separation; J. Mem. Sci. 2008(320); 436-41) have shown that the deposition of palladium by electroless plating on porous ceramic substrates is linked with a number of advantages, such as, for example, improved temperature stability and increased fracture toughness.

WO 2008/04169 A2 describes a gas-selective and gas-permeable membrane based on a porous support, and production thereof. It identifies palladium or an alloy of palladium forming the selective membrane layer. Production takes place by coagulation of a colloidal solution, which is introduced into the pores, which are situated in the nanometer range (80 to 100 nm). The colloidally distributed particles have an average size of 8 to 60 nm. The charge is adjusted via adjustment of the pH.

WO 2012/030212 A1 describes a new technique for depositing thin and selective membrane layers. This method is brought about by electroless plating, with the palladium seeds being applied, and the seeded supports being dried and then subjected to chemical reduction. This is followed by the electroless plating. The layer thicknesses are situated in the range from 1 to 10 µm.

WO 2003/084628 A2 describes a method for producing palladium-alloyed composite membranes which are located on porous substrates. The reported layer thickness is less than 1 μm and is likewise applied by electroless plating methods.

WO 98/17378 A2 discloses a nanofiltration membrane of multilayer construction, comprising a monolithic ceramic multichannel support, a microfiltration separation membrane layer, an ultrafiltration separation membrane layer, and a nanofiltration separation membrane layer, whose pores lie between 0.5 and 1.5 nm. In addition to thermal and chemical stability, the nanofiltration membrane exhibits very good mechanical characteristics.

The entire disclosures of the documents mentioned above are incorporated by reference herein.

In view of the foregoing, it would be advantageous to have available a method for producing a permeation membrane which exhibits high permeability for hydrogen and is designed without inherent defects.

SUMMARY OF THE INVENTION

The present invention provides a method for the production of a permeation membrane which comprises or consists of a metallic, semipermeable substance and is very largely free of defects. This permeation membrane is produced by providing an initially produced porous ceramic support system on one side with a palladium-containing layer which is less than 2 μm thick. The application takes place via a wet-chemical, precursor-assisted preparation variant, employing a complex compound. This complex compound is formed from a palladium salt and a ligand whose molecular size is tailored to the pore size of the support system, and from a solvent tailored to the solubility of this palladium complex. The constituents of the chemical complex used may be supplemented by addition of other (preferably transition) metals, such as copper and silver, for example, for formation of an alloy with palladium. The solvent, with the palladium salt dissolved therein, is applied to the support system by various methods of dip coating and filling. The decisive combination of solvent, palladium salt, and ceramic support system design with defined porosity results in superficial deposition of organic palladium compounds. The solvent is removed by a drying step. The organic constituents are reacted in a thermal treatment and removed. The subsequent temperature treatment under reduced conditions at elevated temperature in the range from about 300° C. to about 900° C. leads to the formation of metallic palladium. The palladium in this case, surprisingly, is synthesized not in the form of separate grains but instead of very thin and dense layers. Very surprisingly, gas-separating layers can be generated by means of this trivial embodiment. The permeation membranes obtained therefrom have hydrogen permeances of at least about 0.6 m$^3$/(m$^2$hbar) and a hydrogen/nitrogen selectivity of at least about 150. The quality of the permeation membrane can be enhanced through a multiple coating, since this allows possible defects in the previous coating to be healed.

BRIEF DESCRIPTION OF THE DRAWING

The invention is elucidated in more detail below with reference to working examples. In the drawing, FIG. 1 shows a tabular representation of individual gas permeances of selected gases on a permeation membrane of the invention.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawing making apparent to those of skill in the art how the several forms of the present invention may be embodied in practice.

As already described in the introductory part of the specification, a very thin metal membrane needs a support system which endows the overall system with mechanical stability but without adversely impacting the separation or mass transport. To start with, therefore, the production of different support systems is presented in three variant embodiments, which are then provided on one side, subsequently, with the metallic layer:

Variant 1: A porous, ceramic tablet of α-Al$_2$O$_3$ with a mean pore diameter of about 3 μm, a tablet diameter of about 18 mm, and a thickness of about 2 mm, produced via ceramic calendering, was progressively coated on one side with ceramic slurries of α-Al$_2$O$_3$ powders of decreasing particle size via spin coating and subsequent sintering, until a final outer layer with a mean pore diameter of about 200 nm had been applied.

Variant 2: A porous, ceramic tube of α-Al$_2$O$_3$ with a mean pore diameter of about 3 μm, an outer diameter of about 10 mm, an inner diameter of about 7 mm, and a length of about 100 mm, produced via extrusion was progressively coated on the inside with ceramic slurries of α-Al$_2$O$_3$ powders of decreasing particle size via slip casting and subsequent sintering, until a final outer layer with a mean pore diameter of about 100 nm had been applied. A colloidal gel was deposited on this final outer layer from a colloidal boehmite sol via dip coating on one side, resulting, after sintering, in a final γ-Al$_2$O$_3$ layer with a mean pore diameter of from about 2 nm and about 5 nm.

Variant 3: In a modification of the second variant, the final outer layer is coated progressively with a colloidal TiO$_2$ sol, a colloidal ZrO$_2$ sol, and a polymeric TiO$_2$ sol, with thermal treatment between each coating operation. The last outer layer was a layer of amorphous TiO$_2$ and had a mean pore diameter of about 0.9 nm.

WORKING EXAMPLE 1

The support system in accordance with the second variant was adopted as the starting body, and was subjected to palladium deposition as follows:

The support system was first subjected to a temperature treatment. This treatment employed temperatures in the region of about 170° C. The duration of the drying step was about five hours. The starting point for the deposition of palladium on the support surface was a solution of palladium acetylacetonate and chloroform. This solution is introduced into the interior of the ceramic tube, which was sealed at one end beforehand. After the introduction process, the introduction side of the tube is likewise sealed. The support system, filled with solvent and with palladium salt present therein, is dried while rotating, until the solvent has completely departed the porous support. The palladium salt is located on the surface in the interior of the support system. There then follows a thermal treatment. For this purpose, the support system with the palladium located on the inner surface is placed into the constant-heat zone of a horizontal oven and is exposed to a controlled atmosphere. Heating under air takes place up to about 400° C. The atmosphere is then rendered inert using nitrogen and/or argon, and heating continues to about 450° C. When the target temperature of about 450° C. is reached, the atmosphere is switched to hydrogen and maintained for a defined time of about one hour. The cooling process takes place under a nitrogen atmosphere. After the oven has cooled to room temperature, the palladium-coated support system or permeation membrane now completed can be withdrawn and passed for further studies. Analytic detection takes place via measurement of various gas permeances (see FIG. 1). From the individual gas permeances measured, it is possible to determine the ideal permselectivities of various gas pairings. The thickness of the internal palladium layer can be measured using study methods of electron microscopy. On the basis of representative scanning electron micrographs at the fracture of these permeation membranes, palladium layer thicknesses of less than about 500 nm were shown.

The low $SF_6$ flow according to FIG. 1 indicates a low defect density.

WORKING EXAMPLE 2

A support system produced in accordance with the first variant was adopted as the starting body, and was subjected to palladium deposition as follows:

The support system was first subjected to a temperature treatment. This treatment employed temperatures in the region of about 170° C. The duration of the drying step was about five hours. The starting point for the deposition of palladium on the support surface was a solution of palladium acetylacetonate and chloroform. This solution is applied dropwise to the support system, which has been set in rotation, and is therefore widely spread (spin coating). The wetted support system is subsequently dried under an air atmosphere. Thereafter the palladium salt with its support system is subjected to thermal treatment. For this purpose, the support system with the palladium located thereon is placed into the constant-heat zone of a horizontal oven and is exposed to a controlled atmosphere. Heating under air takes place up to about 400° C. The atmosphere is then rendered inert using nitrogen and/or argon, and heating continues to about 450° C. When the target temperature of about 450° C. is reached, the atmosphere is switched to hydrogen and maintained for a defined time of one hour. The cooling process takes place under a nitrogen atmosphere. After the oven has cooled to room temperature, the completed permeation membrane can be removed and passed on for further studies.

WORKING EXAMPLE 3

A support system produced in accordance with the third variant was adopted as the starting body, and subjected to palladium deposition as follows:

The support system was again subjected to start with to a temperature treatment in order to dry the membrane. This treatment employed temperatures in the region of about 170° C. The duration of the drying step was about five hours. The starting point for the deposition of palladium on the support surface was a solution of palladium acetylacetonate and chloroform. This solution is introduced into the interior of the ceramic support system, which is already sealed at one end. After this introduction, the other end of the support system is sealed. The support system, filled with solvent and palladium salt, is dried while rotating until the solvent has fully departed the porous support. The palladium salt is located on the surface in the interior of the support system. There then follows a thermal treatment. For this purpose, the support system with the palladium located thereon is placed into the constant-heat zone of a horizontal oven and exposed to a controlled atmosphere. Heating under air takes place to about 400° C. Thereafter the atmosphere is rendered inert using nitrogen and/or argon, and heating continues to about 450° C. When the target temperature of about 450° C. is reached, the atmosphere is switched to hydrogen and maintained for a defined time of one hour. The cooling process takes place under a nitrogen atmosphere. After the oven has cooled to room temperature, the completed permeation membrane can be removed and passed on for further studies.

WORKING EXAMPLE 4

A support system produced in accordance with the second variant was adopted as the starting body, and subjected to palladium deposition as follows:

The support system, at the start, was subjected to temperature treatment. This treatment employed temperatures in the region of about 170° C. The duration of the drying step was about five hours. The starting point for the deposition of palladium on the support surface was a solution of palladium acetylacetonate and chloroform. This solution is introduced into the interior of the ceramic support system, which has previously been sealed at one end. After this introduction, the other end of the support system is sealed. The support system, filled with solvent and with palladium salt present therein, is dried while rotating until the solvent has completely departed the porous support system. The palladium salt is located on the surface in the interior of the support system. There then follows a thermal treatment. For this purpose, the support with the palladium located thereon is placed into the constant-heat zone of a horizontal oven and exposed to a controlled atmosphere. Heating under air takes place up to about 400° C. Thereafter the atmosphere is rendered inert using nitrogen and/or argon, and heating continues to about 450° C. When the target temperature of about 450° C. is reached, the atmosphere is switched to hydrogen and maintained for a defined time of one hour. The cooling process takes place under a nitrogen atmosphere. After the oven has cooled to room temperature, the coated support system can be removed. There then follows a further operation of coating with a palladium salt solution. This solution is based, like the first solution utilized for coating, on palladium acetylacetonate and chloroform. This solution is introduced in turn into the interior of the support system, which has been opened at one end beforehand, and, after being sealed, is dried while rotating until the solvent has fully departed the porous support. The palladium salt is located on the surface in the interior of the support. There then follows a thermal treatment. For this purpose, the support with the palladium located thereon is placed into the constant-heat zone of a horizontal oven and exposed to a controlled atmosphere. Heating under air takes place up to about 400° C. Thereafter the atmosphere is rendered inert using nitrogen and/or argon, and heating continues to about 450° C. When the target temperature of about 450° C. is reached, the atmosphere is switched to hydrogen and maintained for a defined time of one hour. The cooling process takes place under a nitrogen atmosphere. After the oven has cooled to room temperature, the completed permeation membrane can be removed.

What is claimed is:

1. A method for producing a permeation membrane which comprises a nanoporous support system having pores in a size range of from 0.5 nm to 50 nm, wherein the method comprises providing the support system with a palladium layer by:
   (a) applying a palladium complex with or without one or more alloying elements, dissolved in a solvent, to the support system,
   (b) removing the solvent by drying,
   (c) removing of organic constituents of the palladium complex by a heat treatment,
   (d) carrying out a final heat treatment under reducing conditions at a temperature ranging from about 300° C. to about 900° C.;
the palladium of the palladium layer being the palladium present in the palladium complex employed in (a).

2. The method of claim 1, wherein the one or more alloying elements comprise a metal selected from copper and silver.

3. The method of claim 1, wherein the palladium complex consists of a palladium salt.

4. The method of claim 3, wherein the palladium salt is palladium acetylacetonate.

5. The method of claim 1, wherein prior to (a), the support system is provided with a layer of one or more of $\gamma$-$Al_2O_3$, $TiO_2$, $SiO_2$, and $ZrO_2$.

6. The method of claim 1, wherein (a) to (d) are carried out two or more times in succession.

7. The method of claim 2, wherein the one or more alloying elements comprise silver.

8. The method of claim 2, wherein the one or more alloying elements comprise copper.

9. The method of claim 4, wherein the solvent is or comprises chloroform.

10. The method of claim 1, wherein (d) is carried out in an atmosphere which comprises hydrogen.

11. The method of claim 1, wherein the support system comprises or consists of $\alpha$-$Al_2O_3$.

12. The method of claim 11, wherein prior to (a), the support system is provided with a layer of one or more of $\gamma$-$Al_2O_3$, $TiO_2$, $SiO_2$, and $ZrO_2$.

13. The method of claim 1, wherein only one side of the support system is provided with the palladium layer.

14. The method of claim 1, wherein a palladium-containing layer applied in (a) has a thickness of less than 2 µm.

15. The method of claim 1, wherein the membrane exhibits a hydrogen permeance of at least about 0.6 $m^3$/($m^2$hbar).

16. The method of claim 1, wherein the membrane exhibits a hydrogen/nitrogen selectivity of at least about 150.

17. A method for producing a permeation membrane which comprises a nanoporous support system having pores in a size range of from 0.5 nm to 50 nm, wherein the method comprises providing the support system with a palladium layer by:
   (a) applying palladium acetylacetonate with or without one or more alloying elements selected from copper and silver, dissolved in chloroform, to one side of the support system,
   (b) removing the chloroform by drying,
   (c) removing of organic constituents of the palladium acetylacetonate by a heat treatment,
   (d) carrying out a final heat treatment under a reducing atmosphere comprising hydrogen at a temperature ranging from about 300° C. to about 900° C.;
the palladium of the palladium layer being the palladium present in the palladium complex employed in (a).

18. The method of claim 17, wherein prior to (a), the support system is provided with a layer of one or more of $\gamma$-$Al_2O_3$, $TiO_2$, $SiO_2$, and $ZrO_2$.

19. The method of claim 17, wherein a palladium-containing layer applied in (a) has a thickness of less than 2 µm.

20. A permeation membrane obtained by the method of claim 1.

* * * * *